Figure 1:
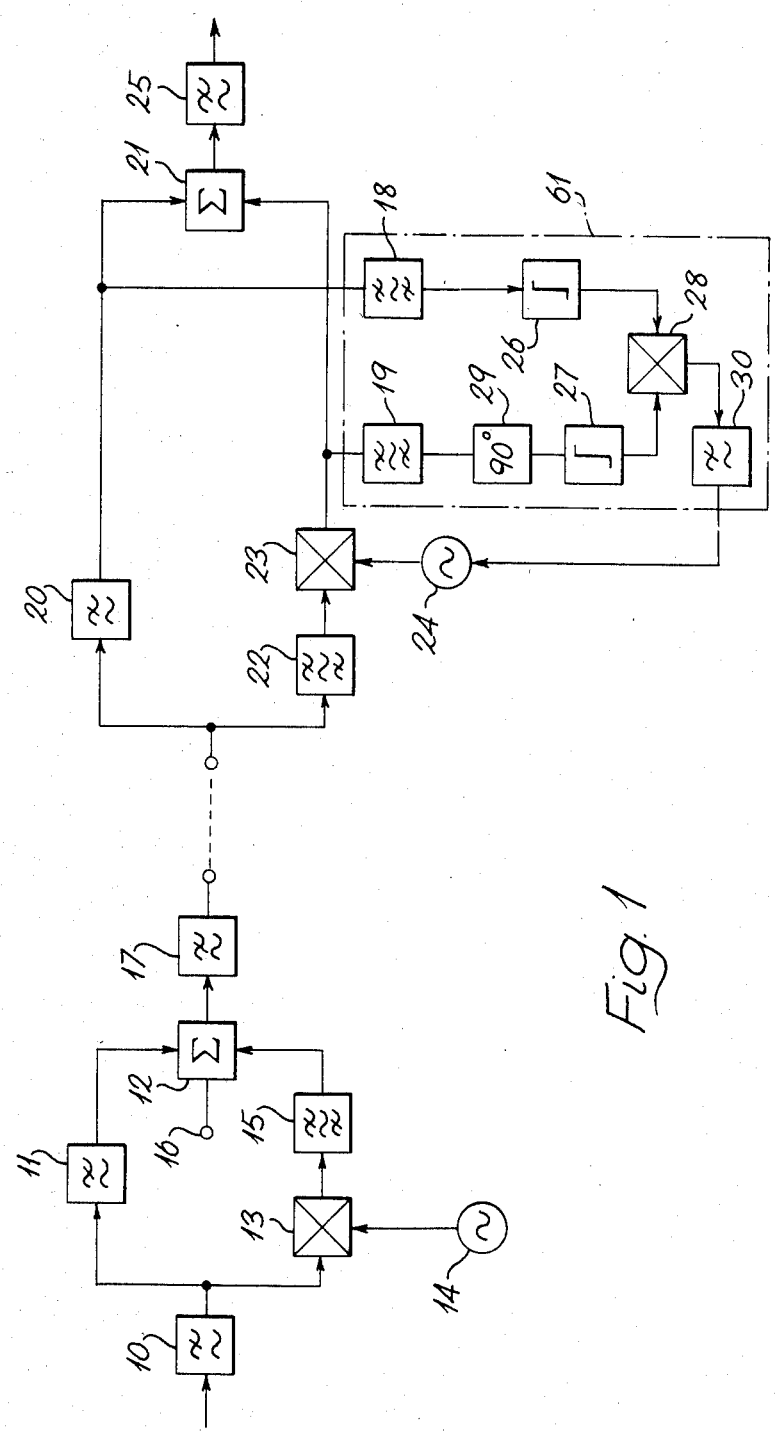

United States Patent [19]

McGeehan et al.

[11] Patent Number: 4,691,375
[45] Date of Patent: Sep. 1, 1987

[54] DATA TRANSMISSION USING A TRANSPARENT TONE-IN BAND SYSTEM

[75] Inventors: Joseph P. McGeehan, Wiltshire; Andrew Bateman, Avon, both of England

[73] Assignee: National Research Development Corporation, London, England

[21] Appl. No.: 617,733

[22] Filed: Jun. 6, 1984

[51] Int. Cl.$^4$ ............................................. H04B 1/76
[52] U.S. Cl. ..................................... 455/71; 375/43; 375/61; 375/77; 375/97; 455/47; 455/257
[58] Field of Search ................ 455/46, 47, 48, 59, 455/67, 68, 70, 71, 257, 26; 329/50; 375/11, 37, 41, 43, 97, 77; 370/69.1, 120, 101, 110.1, 110.4, 111; 178/22.1; 179/1.5 R, 1.5 F S

[56] References Cited

U.S. PATENT DOCUMENTS

| | | | |
|---|---|---|---|
| 3,571,717 | 3/1971 | Monrolin | 455/46 |
| 3,684,838 | 8/1972 | Kahn | 455/59 |
| 3,969,675 | 7/1976 | Gosling | 455/46 |
| 4,539,707 | 9/1985 | Jacobs et al. | 455/47 |

OTHER PUBLICATIONS

J. P. McGeehan et al., The Use of "Transparent" tone-In-Band (TTIB) and Feedforward Signal Regeneration (FFSR) in Single Sideband Mobile Communication Systems, IEE Conference on Communications Equipment Systems, 20–22, Apr. 1982, pp. 121–126.
A. J. Bateman et al., The Use of Transparent Tone-In-Band (TTIB) for Coherent Data Schemes with Particular Reference to Single Sideband Modulations, IEEE International Conference on Communications, Jun. 19th and 22nd, 1983, pp. 245 to 249.
J. P. McGeehan et al., Phase Locked Transparent Tone-In-Band (TTIB): A New Spectrum Configuration Particularly Suited to the Transmission of Data Over SSB Mobile Radio Networks, IEEE Transactions on Communications, vol. Com-32, No. 1, Jan. 1984, pp. 81 to 87.
J. P. McGeehan et al., Pilot Tone Single Sideband for Mobile Satellite Communications, IEE Conference Publication No. 222, pp. 153 to 157, 7th to 9th of Jun. 1983.
J. P. McGeehan et al., Speech Communication Over a 942 MHz Tone-Above-Band Single Sideband Mobile Radio Channel (6.25 kHz) Incorporating Feedforward Signal Regeneration, The Institute of Electrical and Electronics, Inc., May 1983, pp. 369 to 373.

*Primary Examiner*—Benedict V. Safourek
*Attorney, Agent, or Firm*—Cushman, Darby & Cushman

[57] ABSTRACT

A communication system which uses a transmitter and a receiver. The transmitter divides a band of interest in the frequency spectrum into upper and lower portions, and frequency translates one of these portions in order to provide a frequency notch between the portions. The receiver of the system includes a receiver processor which receives the upper and lower portions, and which restores the original frequency spectrum. The receiver processor at least partially determines the final position of the restored portion.

27 Claims, 4 Drawing Figures

DATA TRANSMISSION USING A TRANSPARENT TONE-IN BAND SYSTEM

The present invention relates to the provision of facilities for improved data transmission using transparent tone-in-band (TTIB) systems.

TTIB systems are described by J. P. McGeehan, A. J. Bateman and D. F. Burrows in "The Use of 'Transparent' Tone-In-Band (TTIB) and Feedforward Signal Regeneration (FFSR) In Single Sideband Mobile Communication Systems", IEE Conference on Communications Equipment and Systems 82, pages 121 to 126, 1982. In a TTIB system the spectrum of a baseband signal, for example from 300 Hz to 3 kHz, is split into two approximately equal segments, for instance from 300 Hz to 1.7 kHz and 1.7 kHz to 3 kHz. The upper frequency band is translated upward in frequency by an amount equal to the width of an intervening "notch" and added to the lower frequency band. If for example the required "notch" width or band separation is 1.2 kHz the circuit output will comprise a signal extending from 300 kHz to 1.7 kHz and from 2.9 to 4.2 kHz. A low level reference tone may then be added at the centre of the resulting notch which in this example would be 2.3 kHz and the composite signal is then tranmitted using conventional techniques, such as single sideband (SSB), with the pilot tone in the notch acting as the reference for subsequent pilot-based processing. In the receiver, the final stages of audio processing remove the pilot in the usual way (for use in, for example automatic gain control and automatic frequency control purposes) and perform a complementary downwards frequency translation of the upper half of the spectrum thereby regenerating the original 300 Hz to 3 kHz baseband signal. Thus TTIB gives a complete transparent channel from the baseband input of the transmitter to the baseband receiver output avoiding the disadvantage of removing a section of the band in order to insert the pilot tone but obtaining the advantages of high degree of adjacent channel protection, good correlation between fades on the pilot tone and fades on the audio signal, and a large symmetrical pull-in range for the frequency control to operate.

In order to use a TTIB system in data communications with a bit error rate performance equal to or better than that obtained with pilot carrier and above-band tone systems particularly in mobile radio where amplitude and phase fading occurs, the TTIB transmitter and receiver must be locked in frequency and phase to eliminate the mid-band interference region of the unlocked system. An apparent requirement is a frequency and phase reference to be generated from the received signal for use in a phase locked tracking circuit. Unfortunately it is not possible to use the pilot tone transmitted with TTIB for this purpose since the tone suffers from the effects of multipath propagation and possible frequency error due to misalignment of the transmitter and receiver RF/IF local oscillators.

In this specification a TTIB communication system comprises
  a transmitter including means for dividing a band of interest in the frequency spectrum into upper and lower portion, and means for translating one of the portions in frequency to provide a frequency notch between the lower and upper portions after translation, and
  a receiver including a receiver processor for restoring the translated portion to its original place in the frequency spectrum.

If a baseband is considered extending from DC upwards in frequency it will always be necessary to translate the upper portion upwards in the frequency spectrum to provide the frequency notch.

The transmitter and receiver are usually parts of an SSB system and advantages are mainly expected to be gained in mobile radio employing such systems. Other areas of application include land-line communication links.

According to a first aspect of the present invention there is provided a receiver for a TTIB communication system as hereinbefore specified including
  means for deriving first and second signals representative of the phase of the lower and upper portions, respectively, of the band before restoration of one portion to its original place in the frequency spectrum,
  comparison means for so comparing the first and second signals that a control signal is derived which when applied to the receiver processor tends to reduce any phase difference between the first and second signals.

The receiver processor typically comprises a local oscillator and a mixer, and the control signal is applied to control the frequency of the local oscillator.

The main advantage of the first aspect of the invention is that data communication systems employing this aspect are expected to have a bit error rate comparable with or better than that obtained with pilot carrier and above-band tone systems, especially in mobile radio applications.

Two main possible ways of translating a portion of the frequency band of interest are now given as alternatives.

As a first alternative, the transmitter may include a mixer and an oscillator for moving the position of the upper portion upwards in the spectrum. The receiver may then include a further mixer connected to receiver the output signal of the said local oscillator and the upper portion before restoration, the output signal of the mixer being the upper portion restored to its original position in the frequency spectrum.

As a second alternative the tranmitter may include a first oscillator and a first mixer for reducing the frequencies of the upper portion of the band, and a second oscillator and a second mixer for increasing the frequencies of the output signals of the first mixer to provide the final position of the upper portion at the output of TTIB transmitter processing. The receiver may then include third and fourth mixers and a third oscillator, the third mixer and the said local oscillator or the third oscillator reducing the frequencies of the signals received from the transmitter, and the fourth mixer and the remaining receiver oscillator increasing the frequencies of the output signals from the fourth mixer to restore the upper portion of the band to its original position in the spectrum.

The second alternative is more flexible than the first because the width of the notch can be chosen as required whereas using the first alternative the notch must be of sufficient width to avoid spectral overlap in the desired upper-band segment.

In both the first and second alternatives a number of filters are required to remove unwanted signals at different positions in the circuit as will be apparent from the description which follows.

According to a second aspect of the invention there is provided a receiver for a TTIB communication system as hereinbefore specified including means for deriving first and second signals representative of the phase of the lower and upper portions, respectively, of the band before restoration of one portion to its original place in the frequency spectrum, comparison means for so comparing the first and second signals that a control signal is derived which when applied to the receiver processor tends to reduce any phase difference between the first and second signals, wherein the receiver includes first and second delay means for delaying the lower and upper portions, respectively, the comparison means is connected to receive signals on the input side of the first and second delay means as the said first and second signals, the first and second delay means being constructed to impart delays which allow sufficient time for the said reduction of phase difference relating to a temporal position in the receiver input signals to be made by the time the translated portion containing that temporal position is restored to its original position.

The main advantage of the second aspect of the invention is that the whole of a portion of data can be transmitted without errors since feedforward from the inputs of the first and second delay means allows phase correction to be carried out before restoration of the translated poriton to its original position is completed.

The second aspect of the invention can be employed with the first and second alternatives mentioned above.

According to a third aspect of the present invention there is provided a TTIB communication system as hereinbefore specified wherein the means for translating one portion of the input frequency spectrum at the transmitter includes a transmitter local oscillator having an output so connected that the output signal thereof at least partly determines the position of the translated portion in the spectrum, means for multiplying the frequency of the transmitter local oscillator or a frequency derived therefrom, and means for carrying out an operation in the transmitter in accordance with the output of the multiplying means, and wherein the receiver includes a receiver local oscillator having an output so connected that the output signal thereof at least partially determines the final position of the restored portion, means for multiplying the frequency of the receiver local oscillator or a frequency derived therefrom, and means for carrying out an operation in the receiver in accordance with the output of the receiver multiplying means.

Both the first and second alternatives mentioned above may be used in the third aspect of the invention, and when the second is used the multiplying means of both the transmitter and the receiver may multiply the difference frequency between the frequencies of the two tranmitter and the two receiver oscillators, respectively.

The transmitter and receiver of the third aspect of the invention may include complementary circuits, such as modems, requiring reference signals in order to operate, the output of the transmitter multiplying means and the receiver multiplying means may then be used as the required reference signals, an advantage being that a simple technique for achieving bit synchronisation with TTIB systems is provided. Consequently the technique has wide applications including line satellite and mobile communications.

In SSB, and particularly mobile radio SSB, the pilot tone suffers from phase variations but this problem can be overcome by using feedforward signal regeneration (FFSR) as described for TTIB in the 1982 paper by McGeehan, Bateman and Burrows (see FIG. 5). In this solution the frequency of an oscillator in the receiver is made equal to that of the pilot tone. However a problem remains where a received signal is to be coherently demodulated after SSB transmission and demodulation. The third aspect of the invention may be used to allow coherent demodulation if the transmitter includes means for inserting the output of the transmitter multiplying means into the notch, and the receiver includes phase-error correction means for removing phase errors in the receiver output requiring the application of a receiver reference signal having a frequency substantially equal to a reference signal included in the transmitted signal, and means for applying the output signal of the receiver multiplying means as the receiver reference signal.

The phase-error correction means preferably employs a feedforward arrangement.

The invention also includes methods of tranmitting and/or receiving data transmitted using a TTIB system corresponding to any of the above aspects of the invention.

Figure 2:
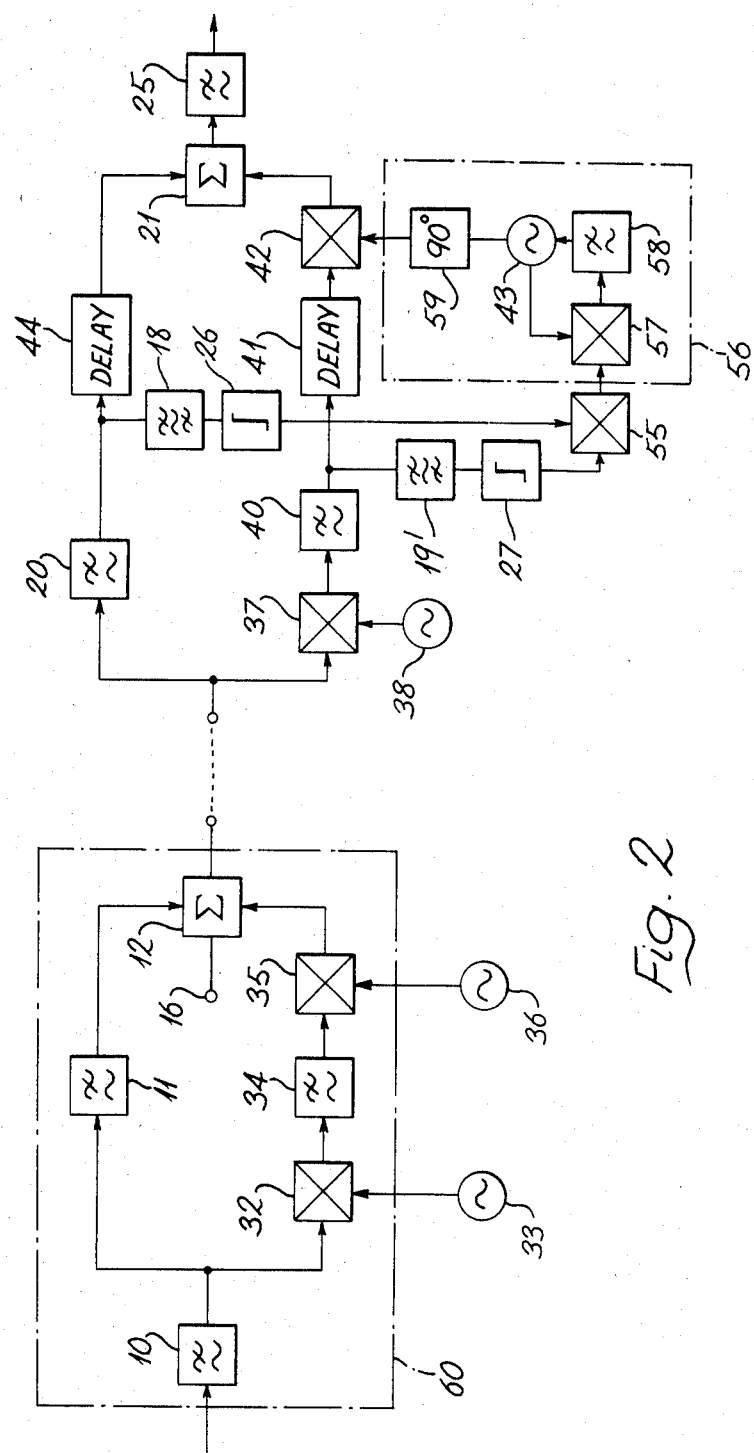
Figure 3:
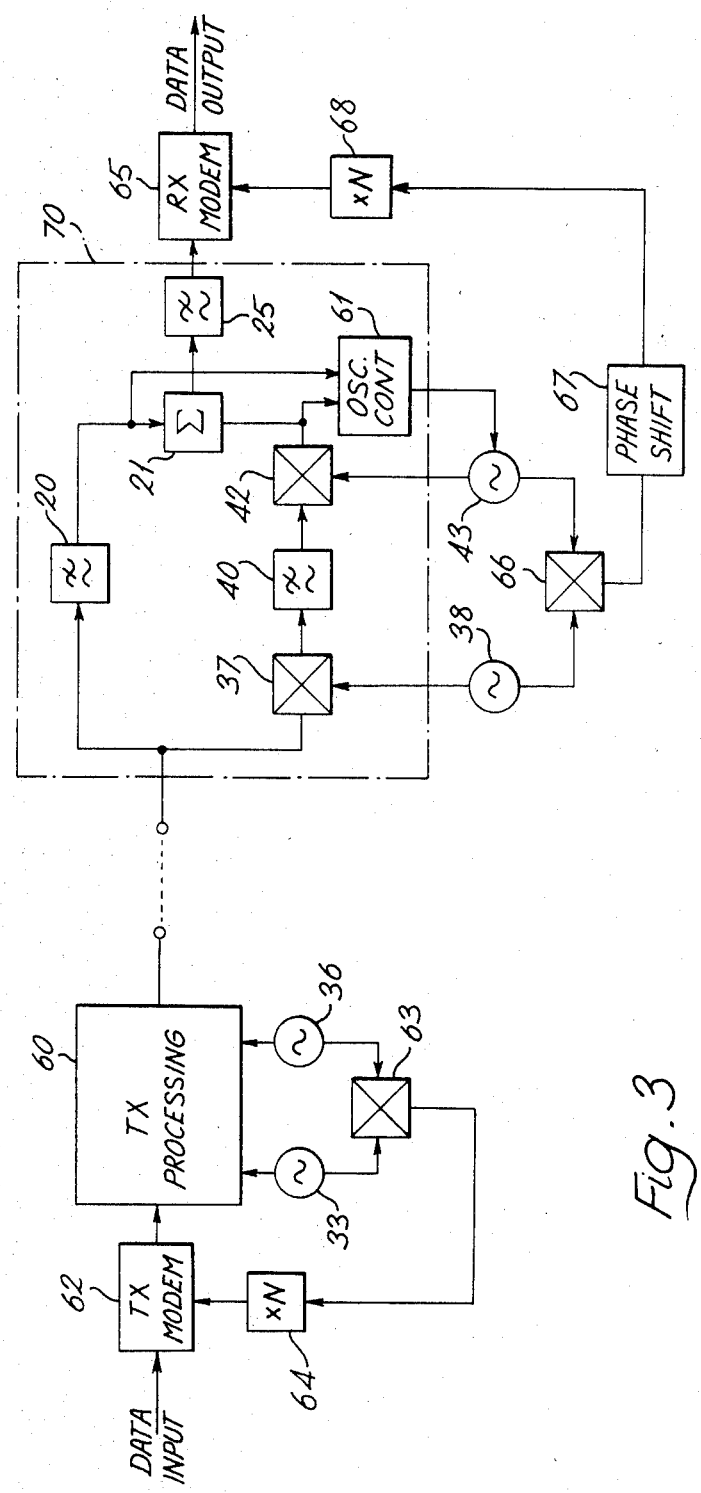
Figure 4:
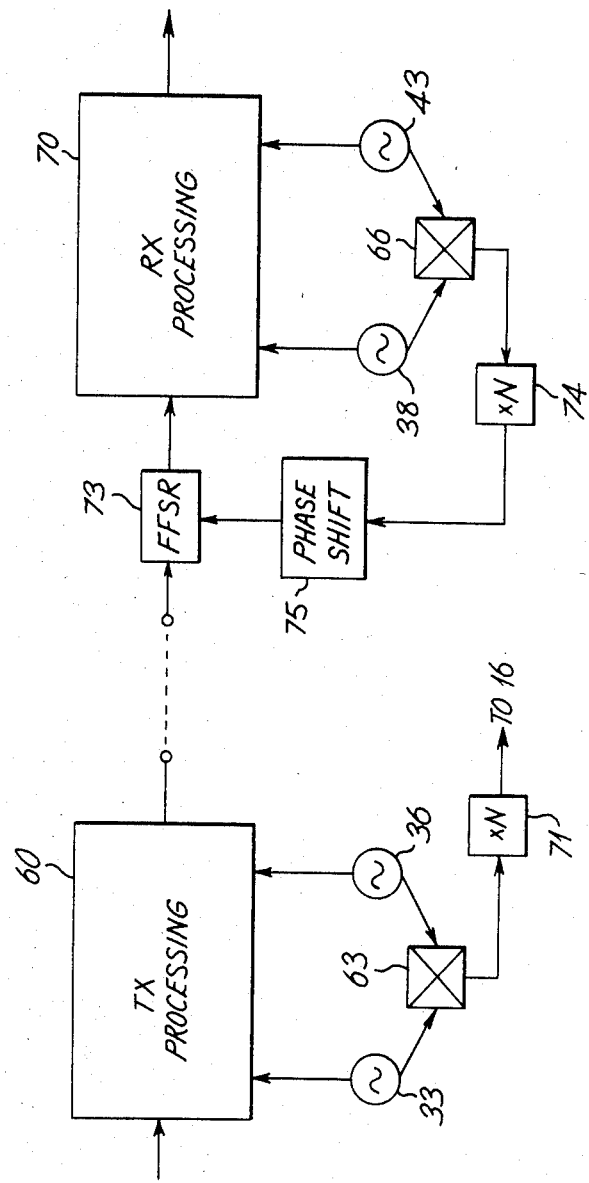

Certain embodiments of the invention will now be described by way of example, with reference to the accompanying drawings, in which:

FIG. 1 is a block diagram of a TTIB system employing a receiver according to a first aspect of the invention, FIG. 2 is a block diagram of a TTIB system employing a receiver according to a second aspect of the invention, FIG. 3 is a block diagram of a first TTIB system according to the third aspect of the present invention providing bit synchronisation, and FIG. 4 is a block diagram of a second TTIB system according to the third aspect of the invention employing FFSR phase correction.

A simple form of TTIB is first described and then a method of phase locking this form is explained.

In FIG. 1 a baseband signal is applied to a low-pass filter 10 to remove any high frequency components outside the band which may be present. At the output of the filter 10 the signal is passed to a further low-pass filter 11 which selects a low frequency portion of the band for application to a combining circuit 12. The output of the filter 10 is also applied to a mixer 13 receiving an additional signal from an oscillator 14 at a frequency equal to the required notch width. The upper sideband of the output of the modulator 13 is selected using a bandpass filter 15 and applied to the combining circuit 12 together with a tone, typically an SSB pilot tone, which is supplied to a terminal 16. The composite signal so produced is passed through another lowpass filter 17 to ensure that no signals outside the required band remain and it is then transmitted, using, for example, an SSB transmitter, over mobile radio to a receiver where the pilot tone is first extracted using a bandpass filter (not shown) for use in pilot-based correction of the SSB signal. After such demodulation a signal comprising the lower band, the notch, the reference tone and the upper band is applied to a low-pass filter 20 where the lower band is extracted and applied to a combining circuit 21. A bandpass filter 22 separates the upper band and applies it to a mixer 23 receiving signals from a local oscillator 24 which restores the upper band to its original place in the spectrum so that when combined with the lower portion in the first combining circuit 21 the original baseband is restored. A lowpass filter 25 ensures that no spurious frequencies outside the baseband are passed to output.

The TTIB system described so far with its unlocked local oscillator 24 in the receiver is satisfactory for informal voice communication but not for conventional data transmission systems such as frequency shift keying (FSK) and differential phase shift keying (DPSK).

In order to overcome this problem it is necessary to lock together the frequency and phase of the transmitter and receiver translation oscillators; this has the effect of ensuring phase integrity in the restored band at the output of a combining circuit 21. See the paper "Phase-Locked Transparent Tone-In-Band (TTIB): A new Spectrum Configuration Particularly Suited to the Transmission of Data Over SSB Mobile Radio Networks" by J. P. McGeehan and A. J. Bateman, IEEE Transactions on Communications, COM-32, No. 1, January 1984, pp 81-87.

Control for the local oscillator 24 is derived by taking the signals from the lower and upper portions of the band after restoration and applying these signals by way of bandpass filters 18 and 19, and limiters 26 and 27 to a phase sensitive detector 28, the phase of the signal of the upper portion of the band being changed by 90° in a circuit 29 before application to the detector 28. The output of the detector 28 passes by way of a low-pass filter 30 before being applied as a control signal for the oscillator 24. The circuits 18, 19, 23, 24 and 26 to 30 form a phase locked loop and the filter 30 determines the order and type of the loop.

The control for the oscillator 24 depends on the outputs of the filters 20 and 22 containing signals in the transition region at the edges of the notch which should nominally be at the same frequency and phase after restoration of the upper portion. Detection of frequency and phase differences in these signals by the detector 28 provides the control signal for the oscillator 24. These signals may be up to 40 to 50 dB below the passbands of the filters. The filters 18 and 19 have passbands of typically 200 Hz and since the upper portion has been restored in frequency at the output of the mixer 23 both of the filters 18 and 19 are centred on the transition region at the lower edge of the notch. The filters 18 and 19 may sometimes by omitted. If necessary the filter 30 is given a frequency characteristic which depends on the roll-off of the filters 11 and 15.

In the following more detailed description of the operation of FIG. 1, it is assumed that the appropriate time delays in all paths are matched, and that the input signal to the filter 10 is represented by $$y_A(t) = \alpha \cos(\omega_s t + \beta)$$

where $\alpha$ and $\beta$ represent the amplitude and phase terms, respectively, of a signal frequency component centred at $\omega_s$, where $\omega_s$ is within the transition region between the upper and lower bands. This signal is then in turn mixed with the frequency translating carrier, $\omega_1$, generated by the oscillator 14 and expressed as:

$$y_B(t) = \cos(\omega_2 t + \psi)$$

where $\psi$ is an arbitrary phase term. The resulting summed and filtered output of the transmitter processing at the output of the filter 17 is then $$y_C(t) = A_1 \alpha \cos(\omega_s t + \beta) + A_2 \alpha \cos\{(\omega_s + \omega_1)t + \beta + \psi\}|_{t \to t - D_1 - D_2}$$

where $A_1\ A_2$ represent the attenuation coefficients of the filters 11 and 15, respectively, $t \to t - D_1 - D_2$ means replace t by $t - D_1 - D_2$, $D_1$ is the delay of the filter 10, and $D_2$ is the delay of the filters 11 and 15.

On reception in a mobile environment for example, the signal is assumed corrupted by both random amplitude and phase modulation, $r(t)$ and $\phi(t)$, and, after demodulation, has a residual frequency offset error of $\Delta\omega$, due to oscillator drift. The input to the receiver processing at the filters 20 and 22 can then be written as $$y_D(t) = A_1 r(t) \alpha \cos\{\omega_s t + \beta + \phi(t) + \Delta\omega t\} + A_2 r(t) \cdot$$
$$\alpha \cos\{(\omega_s + \omega_1)t + \beta + \psi + \phi(t) + \Delta\omega t\}|_{t \to t - D_1 - D_2}$$

If the free-running centre frequency of the voltage controlled oscillator (VCO) 24 is expressed as $$Y_s(t) = \cos(\omega_2 t + \delta)$$

where $\delta$ is an arbitrary phase term, then the two input signals to the summing circuit 21 are given by $$y_E(t) = A_3 A_1 r(t) \alpha \cos\{\omega_s t + \beta + \phi(t) + \Delta\omega t\}|_{t \to t - D_1 - D_2 - D_3}$$

and $$y_F(t) = A_4 A_2 r(t) \alpha \cos\{(\omega_s + \omega_1 - \omega_2)t + \beta + \phi(t) +$$
$$(\psi - \delta) + \Delta\omega t - \omega_2(D_1 + D_2 + D_3)\}|_{t \to t - D_1 - D_2 - D_3} +$$
$$\text{components at } (\omega_s + \omega_1 + \omega_2)$$

where it is assumed that the passbands of the filters 20 and 22 are sufficiently wide to pass the input signal without distortion except for a constant attenuation $A_3$, $A_4$ and time delay $D_3$.

For satisfactory combining of these two signals defined, the frequency and phase of the oscillator 24 must by adjusted such that $$(\omega_1 - \omega_2) = 0, \text{ and } (\psi - \delta) - \omega_2(D_1 + D_2 + D_3) = 0 \qquad \text{equation 1}$$

After filtering to remove the "2f" components from the mixer processing and to improve the signal-to-noise ratio of the signals being fed into the limiters, the two signals are mixed and filtered to obtain the difference term $y_1(t)$, which is used to control the oscillator 24. The bandpass filters and limiters are included in the circuit to extract the frequency components in the sub-band overlap region and to remove the effects of envelope fading and speech modulation so that the input to the double balanced mixer and the loop gain, K, are held constant. In some circumstances it can be advantageous to exclude the limiters to reduce the noise sensitivity of the system. The resulting difference term is given by $$y_f(t) = k \sin\{(\omega_1 - \omega_2)t + \psi - \delta\omega_2 \cdot (D_1 + D_2 + D_3)\}|_{t \to t - D_1 - D_2 - D_3}$$

which is independent of the multipath induced fading, containing only the required information concerning the frequency and phase error between the transmitter and receiver translating oscillators, and phase shifts introduced by the transmission link. This signal is used to modify the frequency and phase of the oscillator 24 such that the frequency error is eliminated and the phase error minimised.

Inherent in the application of feedback phase lock techniques for correct sub-band recombination is a small but finite time delay in which correction of the local oscillator 24 is achieved. Standard acquisition aids can be applied here to advantage. The inherent delay may cause temporary errors while correction is applied but this problem can be overcome in a way which will now be described with reference to FIG. 2 but by way of illustration another form of TTIB is employed in the transmitter and receiver. In FIG. 2 as in FIGS. 3 and 4 component circuits which have the same function as in an earlier Figure or Figures have the same disignations and are not further described.

In FIG. 2, the output from the low-pass filter 10 is applied to a mixer 32 which also receives a signal from an oscillator 33 so that the whole baseband is moved up in frequency as a result of mixing. The lower portion of the lower sideband of the resultant signal now corresponds to the upper portion of the baseband signal and this upper portion from the mixer 32 is removed using a low-pass filter 34. The resulting signal corresponding to the upper portion of the baseband, but reversed in frequency, is applied to a further mixer 35 receiving another signal from an oscillator 36 and the resultant signal is applied to the combining circuit 12. This arrangement is flexible in terms of notch width since the notch width equals the frequency of the oscillator 36 minus that of the oscillator 33. Such a transmitter is described in the 1984 paper by McGeehan and Bateman where FIG. 2 illustrates the frequency translations used.

Assuming SSB transmission, the receiver signal obtained, after SSB demodulation using the pillot tone, is applied to a mixer 37 also coupled to an oscillator 38. The upper portion of the original received signal now forms part of the lower sideband of the output from the mixer 37 and the whole of this output except the said upper portion is removed by means of a low-pass filter 40 and then applied by way of a delay circuit 41 to another mixer 42 coupled to an oscillator 43. The lower portion of the baseband signal available at the output of the low-pass filter 20 is passed through a delay circuit 44 before it is reunited with the upper portion in the combining circuit 21. The delays of the circuits 41 and 44 are such that parts of the upper and lower portions which correspond in time arrive at the combining circuit 21 at the same time.

In order to apply phase locking the output signals of the low-pass filters 20 and 40 are applied via bandpass filters 18 and 19' and limiters 26 and 27 to a mixer 55 the output of which is used to control a phase locked loop (PLL) 56 comprising the oscillator 43, a mixer 57 and a low-pass filter 58. The oscillator output is fed via a 90° phase-shift circuit 59 to the mixer 42. By taking output signals from the filters 20 and 40 before the delay circuits 41 and 44 and using these signals to derive a signal to correct the frequency of the oscillator 43, this correction can be provided for the whole of any input signal to the receiver including the initial portion, at the expense of delaying the output signal by the interval imparted by the delays of the circuits 41 and 44, this interval being chosen to be sufficient for such correction to be carried out.

Since the output of the filter 40 has not been translated to its original position in the frequency spectrum, the passband of the filter 19' is centred on the transition region of the upper band segment.

The circuits 43, 57 and 58 can be regarded as selecting a frequency nominally equal to the frequency of the oscillator 36 and for this reason these circuits may be replaced by a bandpass filter or a combination of a bandpass filter and a phase locked loop.

In some circumstances it is thought possible that the input signals for the filters 18 and 19' may be taken from the inputs of the filters 20 and 40 instead of their outputs. As in FIG. 1, there are arrangements in which the filters 18 and 19' can be omitted.

Making the same assumptions as were made for FIG. 1, but omitting the phase term $\alpha$, the arbitrary phase terms $\beta$, $\psi$ and random amplitude modulation $r(t)$, the input signal to the receiver combining circuit is $$A_1 \cos(\omega_s t + \phi(t) + \Delta\omega t) + A_2(\omega_s t + (T_2 - T_1)t + \phi(t) + \Delta\omega t)$$

where $T_1$ and $T_2$ are the frequencies of the oscillators 33 and 36, respectively.

The output from the filter 20 is $$A_3 A_1 \cos(\omega_s t + \phi(t) + \Delta\omega t)$$

and that from the filter 40 is $$A_4 A_2 \cos(R_1 t - \omega_s t - (T_2 - T_1)t - \phi(t) - \Delta\omega t)$$

where $R_1$ is frequency of the oscillator 38.
Thus the sum term output signal from the mixer 55 is $$A_3 A_4 A_1 A_2 \cos(R_1 t - (T_2 - T_1)t)$$

The PLL 56 comprising the components 43, 57 and 58 cause the frequency $R_2$ of the oscillator 43 to be given by $$R_2 = R_1 - (T_2 - T_1)$$

that is $$R_2 - R_1 = T_1 - T_2 \qquad \text{equation 2}$$

Hence the output of the mixer 42 is $$A_4 A_2 \cos(\omega_s t + \phi(t) + \Delta\omega t)$$

which is combined with the output of the filter 20 to give the baseband signal assuming the delays imparted by the circuits 41 and 44 are equal.

The feed forward technique shown in FIG. 2 can equally be applied to the circuit of FIG. 1 by introducing delays following the filters 20 and 22 and taking the signals for the circuits 26 and 29 from the inputs of these delays. A further mixer is however necessary in order to translate the frequency of the output from the delay following the filter 22 to the correct part of the spectrum.

Where a data stream is to be transmitted in mobile radio SSB the need to obtain bit synchronisation in a receiver modem arises. The required clock timing signal is required to be independent of both randmom phase fluctuations and demodulation frequency error. Such a signal can be obtained from the arrangement shown in FIG. 3 where a data input is applied to a transmitter modem 62 and then to the TTIB transmitter processor which is the same as that of FIG. 2 and is designated 60 in both FIG. 2 and FIG. 3. The clock frequency for the modem is derived from the signals of oscillators 33 and 36 which play the same part in TTIB processing as they do in the arrangment of FIG. 2. The output of the oscillators 33 and 36 is applied to a mixer 63 which derives an output signal having a frequency equal to the difference frequency of its input signals and the output of this mixer after multiplication in a multiplier 64 is applied as the clock signal for the modem 62.

After transmission by any convenient means and demodulation the signal containing data is applied to a low-pass filter 20 as in FIGS. 1 and 2. The receiver input signal is also applied to the circuit branch comprising the mixers 37 and 42 and the low-pass filter 40. This arrangment is the same as shown in FIG. 2 except that since feedforward control is not used in this example the delay 41 is omitted. The oscillator 43 is controlled by an oscillator control circuit 61 which is the same as that indicated by the designation 61 and the dotted line in FIG. 1. The output signal of the low-pass filter 25 is applied to a receiver modem 65 which generates the data output. The clock frequency for the modem 65 is derived from the oscillators 38 and 43 by passing their output signals to a mixer 66 which derives a signal having a frequency which equals the difference between the frequencies of the oscillators 38 and 43. The output of the mixer 66 is connected by way of an adjustable phase shift circuit 67 and a multiplier 68 to the input clock terminal of the modem 65. The multipliers 64 and 68 multiply the output frequencies of the mixers 63 and 66, respectively, by a convenient factor N to provide a suitable clock frequency.

As a brief explanation of the operation of FIG. 3 the output signal of the oscillator 43 can be regarded as being locked in frequency and phase by the phase sensitive detector 61 to a predetermined relationship with the oscillator 38, this relationship being the same as that between the output signals of the oscillators 33 and 36 in the transmitter. Hence the difference frequencies of the transmitter oscillators and the receiver oscillators can be used to derive the modem clock signals.

In FIG. 3 the clock signal suplied to the modem 62 is $$e_t(t) = N \cos((T_2 - T_1)t + \psi_{T2} - \psi_{T1}) \quad \text{equation 3}$$

where N is the multiplication factor of the multiplier circuits 64 and 68.

$\psi_{T1}, \psi_{T2}$ are the phases of the oscillators 33 and 36, and ideally this signal $e_t(t)$ should also be supplied as the clock signal for the modem 65 after it has suffered the same delays as the output signal of the modem 62.

The clock signal for the modem 65 is given by $$e_r(t) = N \cos\{(R_1 - R_2)t + \psi_{R1} - \psi_{R2}\}$$

where $\psi_{R1}, \psi_{R2}$ are the phases of the oscillators 38 and 43.

Since, in view of the operation of the PSD 61, $T_2 - T_1 + R_2 - R_1 = 0$ (see equation 2) and, as can be shown for a phase locked TTIB system, the phase tracking error $\psi_e$ at the output of the combining circuit 25 is $$\psi_e = \psi_{T2} - \psi_{T1} + \psi_{R2} - \psi_{R1} - T_1(D_0 + D_1) - R_1(D_0 + D_1 + D_2) + R_2(D_0 + D_1 + D_2 + D_3) \quad \text{equation 4}$$

where $D_0, D_1, D_3$, are the delays of filters 10, 11 and 34, and 20 and 40, and $D_2$ is the variable time delay due to transmitter and receiver RF/IF processing and propagation delay.

Using equations 2 and 4 the expression for $e_t(t)$ can therefore be rewritten as follows $$e_t(t) = N \cos((T_2 - T_1)t + \psi_{T2} - \psi_{T1} - T_1 D_0 + T_2(D_0 + D_1) - R_1(D_0 + D_2 + D_3) + R_2(D_0 + D_1 + D_2 + D_3) - \psi_e) \quad \text{equation 5}$$

Any error in the required clock signal for the modem 65 is found by taking equation 1 modified by the delays $D_0, D_1, D_2, D_3,$ and $D_4$ (where $D_4$ is the delay due to the filter 25) from the above expression for $e_t(t)$, with the result that the difference in frequency $\delta\omega$, and phase $\delta\psi$ between the desired and received data clock is $$\delta\psi + \delta\omega = N(\psi_e - (T_2 - T_1)(D_0 + D_4) - T_2 D_1 + R_2 D_3)$$

Hence there is no frequency error and the phase error is independent of the variable system delay $D_2$ and can be compensated by the fixed phase shift 67 when correctly adjusted in the receiver clock path. The only residual error is the loop phase tracking error $\psi_e$ and by using narrowband tracking loops, this error can be made arbitrarily small.

The principle of operation of the circuit of FIG. 3 can be applied to that of FIG. 1 so that a transmit modem connected at the input of the filter 10 receives its clock signal from a multiplier connected to the oscillator 14 and in the receiver a receive modem connected at the output of the filter 25 recieves its clock signal from the oscillator 24 by way of an adjustable delay circuit and a further multiplier.

Where clock signals for modems are provided in the way described, the feedforward technique of FIG. 2 may also be used; that is for example the technique can be applied to the arrangement of FIG. 3 by and addition of delays 41 and 44 and the mixer 55.

The TTIB FFSR system described in the 1982 paper by McGeehan, Bateman and Burrows reduces that frequency uncertainty between transmitter and receiver local oscillators which results in frequency error in the demodulated baseband signal. Where coherent demodulation is required for example in data transmission the remaining frequency error is still, though small, important. To provide coherent demodulation within, for example modems designed to make use of TTIB FFSR, the arrangement shown in FIG. 4 can be employed. The baseband input is applied to the TTIB transmitter processing circuit 60 and a control tone which is inserted in the notch is derived from the difference frequency of the output signals of the oscillators 33 and 36 which are applied as in FIG. 3 to a mixer 63. After multiplication in a multiplier circuit 71 to a convenient frequency the output of the mixer 63 is applied to the terminal 16 (see FIG. 2) for insertion in the notch.

At the receiver, envelope and phase differences between the baseband input signal at the transmitter and that derived by the receiver are corrected by an FFSR circuit 73 connected at the input to a TTIB receiver processing circuit 70 which is as shown by the same designation in FIG. 3. The FFSR circuit 73 is as shown in FIG. 5 of the 1982 paper by McGeehan, Bateman and Burrow except that the local oscillator having an output frequency of $\omega_2$ shown in FIG. 5 is replaced by a signal derived from the output signals of the oscillators 38 and 43. These output signals are applied to the mixer 66 which derives the difference frequency. The output of the mixer 66 is connected to a multiplier circuit 74 which provides the required signal to replace $\omega_2$. Multipliers 71 and 74 both multiply by the same convenient factor N.

From the 1982 paper it will be apparent that the signal $y_e(t)$ at the output of the FFSR circuit 73 is $$y_e(t) = A_1 a\cos(\omega_s t + \beta + \delta\omega_k t + \delta\psi_k) +$$
$$A_2 a\cos(T_2 - T_1 + \omega_s)t + \beta + (T_2 - T_1)D_0 + \delta\omega_k t + \delta\psi_k + T_2 D_1)$$

where $\delta\omega_k$, $\delta\psi_k$ = frequency and phase difference between the FFSR local oscillator (that is the output signal of the multiplier circuit 74) and the delay transmitted tone (that is as originating through application to the terminal 16).

The local oscillator input is given by equation 5 and the corresponding delayed transmitted reference signal $y_1(t)$ is $$Y_t(t) = \cos N((T_2 - T_1)(t - D_2) + \psi_{T2} - \psi_{T1}) \qquad \text{equation 6.}$$

Thus from equations 5 and 6, the difference frequency and phase between the transmitted reference and the local FFSR reference superimposed upon the baseband output signal is given by $$\delta\omega_k + \delta\psi_k = N(\psi_e - T_1 D_1 - R_2 T_3).$$

Hence demodulation frequency error is eliminated and the phase error $\delta\psi_k$ is independent of the time delay $D_2$ and can therefore be compensated by an adjustable phase shift circuit 75 connected between the multiplier 74 and the FFSR circuit 73. Consequently coherent demodulation of the received signal is achieved.

Again it will be appreciated that the FFSR correction technique can be applied to a circuit of the type shown in FIG. 1 by multiplying the output frequency of the oscillator 14 and applying it to the terminal 16 as a signal in the notch. At the reciever the output signal from the oscillator 24 is multiplied by the same amount and applied to an FFSR correction circuit connected at the input to the filters 20 and 22. In addition the feedforward technique of FIG. 2 can be applied to FIG. 4 or FIG. 1 when modified to employ FFSR.

Having explained a number of specific embodiments of the invention it will be clear that the invention can be put into practice in many other ways.

We claim:

1. A receiver for a communication system which employs a transmitter comprising frequency selection and translation means for dividing a band of interest in the frequency spectrum into upper and lower portions with at least one signal present at a significant level in both portions and carrying out frequency translation, the output signal of the frequency selection and translation means having one said portion which is translated in frequency to provide a frequency notch between the lower and upper portions, the receiver comprising:
a receiver processor for restoring the original frequency spectrum,
means for deriving first and second signals representative of the phase of the said one signal in those parts of the restored spectrum derived from the lower and upper portions, respectively, and
comparison means for comparing the first and second signals to derive a control signal which when applied to the receiver processor tends to reduce any phase difference between the first and second signals, the output of the comparison means being coupled to the said receiver processor.

2. A receiver according to claim 1 wherein the processor comprises a local oscillator and a mixer coupled to the local oscillator to receive a carrier signal therefrom, and the control signal is applied to control the frequency of the local oscillator.

3. A receiver according to claim 1 for a communication system in which the transmitter includes a mixer and an oscillator for moving the position of the upper portion upwards in the spectrum,
wherein the receiver comprises a local oscillator and a further mixer connected to receive the output signal of the said local oscillator and the upper portion before restoration, the output signal of the said further mixer being the upper portion restored to its original position in the frequency spectrum.

4. A receiver according to claim 1 in which the transmitter includes a first oscillator and a first mixer for reducing the frequencies of the upper portion of the band, and a second oscillator and a second mixer for increasing the frequencies of the output signals of the first mixer to provide the final position of the upper portion at the output of the transmitter
wherein the receiver comprises third and fourth mixers and a third oscillator, the third mixer and the said local oscillator or the third oscillator reducing the frequencies of the signals received from the transmitter, and the fourth mixer and the remaining receiver oscillator increasing the frequencies of the output signals from the fourth mixer to restore the upper portion of the hand to its original position in the spectrum.

5. A receiver for a communication system which employs a transmitter comprising frequency selection and translation means for dividing a band of interest in the frequency spectrum into upper and lower portions with at least one signal present at a significant level in both portions and for frequency translation, the output signal of the frequency selection and translation means having one said portion which is translated in frequency to provide a frequency notch between the lower and upper portions after translation, the receiver comprising:
a receiver processor for restoring the original frequency spectrum,
means for deriving first and second signals representative of the phase of the said one signal in those parts of the restored spectrum derived from the lower and upper portions, respectively,
comparison means for comparing the first and second signals to derive a control signal which when applied to the receiver processor tends to reduce any phase difference between the first and second signals, the output of the control means being coupled to the said receiver processor, wherein the receiver includes first and second delay means for delaying the lower and upper portions, respectively, the comparison means is connected to receive signals on the input side of the first and second delay means as the said first and second signals, the first and second delay means being constructed to impart delays which allow sufficient time for the said reduction of phase difference relating to a temporal position in the receiver input signals to be made by the time the translated portion containing that temporal position is restored to its original position.

6. A communication system comprising:

a transmitter including a transmitter processor for dividing a band of interest in the frequency spectrum into upper and lower portions, the transmitter processor including:

(a) translation means for translating one of the portions in frequency to provide a frequency notch between the lower and upper portion after translation, (b) a transmitter local oscillator connected to the translation means to at least partly determine the position of the translated portion in the spectrum, (c) transmitter multiplying means, connected to the transmitter local oscillator, for multiplying a frequency determined by the transmitter local oscillator, and (d) transmitter operating means, connected to said transmitter multiplying means, for operating on signals passing by way of the transmitter in accordance with the output of said transmitter multiplying means; and a receiver including a receiver processor for receiving the upper and lower portions from said transmitter, the receiver processor comprising:

(a) restoring means for restoring the original frequency spectrum, (b) a receiver local oscillator connected to said restoring means to at least partially determine the final position of a restored portion of the frequency spectrum, (c) receiver multiplying means connected to said receiver local oscillator for multiplying a frequency determined thereby, and (d) receiver operating means, connected to said receiver multiplying means, for operating on signals passing by way of the receiver in accordance with the output of said receiver multiplying means.

7. A communication system according to claim 6 wherein the transmitter and receiver each employ a further local oscillator for use in translating the said one portion and the transmitter and the receiver multiplying means multiply the difference frequency between the frequencies of the two transmitter local oscillators and the two receiver local oscillators, respectively.

8. A communication system according to claim 6 comprising transmitter and receiver modems, the transmitter modem being connected at the input to the means for dividing the band of interest and to receive a clock signal from the transmitter multiplier means, and the receiver modem being connected at the output of the receiver processor and to receive a clock signal from the receiver multiplier means.

9. A communication system according to claim 6 wherein the transmitter includes means for inserting the output of the transmitter multiplying means into the notch, and the receiver includes phase-error correction means for removing phase errors in the receiver output requiring the application of a receiver reference signal having a frequency substantially equal to a reference signal included in the transmitted signal, and means for applying the output signal of the receiver multiplying means as the receiver reference signal.

10. A receiver for a communication system which employs a transmitter comprising frequency selection and translation means for dividing a band of interest in the frequency spectrum into upper and lower portions with at least one signal present at a significant level in both portions and for carrying out frequency translation, the output signal of the frequency selection and translation means having one said portion which is translated in frequency to provide a frequency notch between the lower and upper portions, the receiver comprising:

a receiver processor for restoring the original frequency spectrum, means for deriving a correcting signal dependent upon any difference in frequency and phase in the said one signal in those parts of the restored spectrum derived from the lower and upper portions respectively, and error-reduction means coupled to the said receiver processor for reducing any said frequency and phase difference in the output of the said receiver processor in accordance with the correcting signal.

11. A receiver according to claim 10 wherein the correcting signal is applied to reduce frequency and phase difference at a position in the receiver which, as far as signal transmission is concerned, follows the position from which the correcting signal is derived.

12. A receiver according to claim 11 including delay means for delaying the lower and upper portions of the band before the restoration of the translated portion to its original position, the delay means being arranged to impart delay sufficient for the error-reduction means to reduce any frequency and phase difference relating to a temporal position in the receiver input signals by the time the translated portion containing the temporal position is restored to its original position.

13. A receiver according to claim 12 wherein the means for deriving a correcting signal includes means for deriving first and second signals representative of the frequency and phase of the lower and upper portions, respectively, of the band before restoration of one portion to its original place in the frequency spectrum, comparison means for so comparing the first and second signals that a control signal is derived which when applied to the error reduction means tends to reduce any frequency and phase difference between the first and second signals, the means for deriving the first and second signals receiving the lower and upper portions as input signals from first and second points in processing carried out by the receiver, respectively, and the error reduction means receiving the lower and/or upper portions as input signals from the first and/or second points.

14. A receiver according to claim 10 wherein the error reduction means forms part of the receiver processor.

15. A receiver according to claim 12 wherein the delay means includes first and second delay portions for delaying the lower and upper portions of the spectrum, respectively, and the comparison means is connected to receive signals on the input side of the first and second delay portions as the said first and second signals.

16. A receiver according to claim 14 wherein the processor comprises a local oscillator and a mixer coupled to the local oscillator to receive a carrier signal therefrom, and the correcting signal is applied to control the frequency of the local oscillator.

17. A receiver according to claim 14 for a communication system in which the tansmitter includes a mixer and an oscillator for moving the position of the upper portion upwards in the spectrum, wherein the receiver comprises a local oscillator and a further mixer connected to receive the output signal of the said local oscillator and the upper portion before restoration, the output signal of the said further mixer being the upper portion restored to its original position in the frequency spectrum.

18. A receiver according to claim 17 wherein the means for deriving a correcting signal comprises a mixer connected to receive at respective inputs the lower and upper portions or signals derived therefrom, to derive the correcting signal and to apply the correcting signal to control the frequency of the local oscillator, and quadrature phase change means connected to change the phase of one of the input signals to the mixer, or its output signal or the output signal of the local oscillator.

19. A receiver according to claim 14 for a communication system in which the transmitter includes a first oscillator and a first mixer for reducing the frequencies of the upper portion of the band, and a second oscillator and a second mixer for increasing the frequencies of the output signals of the first mixer to provide the final position of the upper portion at the output of the transmitter wherein the receiver comprises third and fourth mixers, the third mixer and the said local oscillator reducing the frequencies of the signals received from the transmitter, and the fourth mixer increasing the frequencies of the output signals from the third mixer to restore the upper portion of the band to its original position in the spectrum.

20. A receiver according to claim 19 wherein the means for deriving a correcting signal comprises a fifth mixer arranged to receive the lower and upper portions or respective signals derived therefrom and to supply a signal to the fourth mixer to mix with the output of the third mixer.

21. A receiver according to claim 20 including phase locked loop means and/or an averaging filter connected between the fifth and fourth mixers.

22. A communication system having a receiver according to claim 10 and a transmitter, wherein the transmitter includes frequency selection and filtering means dividing a band of interest in the frequency spectrum into upper and lower portions, and for frequency translation, the output signal of the frequency selection and translation means having one said portion which is translated in frequency to provide a frequency notch between the lower and upper portions, the frequency selection and translation means including a transmitter local oscillator having an output so connected that the output signal thereof at least partly determines the position of the translated portion in the spectrum, multiplying means for multiplying the frequency of the transmitter local oscillator or a frequency derived therefrom, and means for carrying out an operation in the transmitter in accordance with the output of the said multiplying means.

23. A method for use in a receiver of a communication system which employs a transmitter comprising frequency selection and filtering means dividing a band of interest in the frequency spectrum into upper and lower portions with at least one signal present at a significant level in both portions and for frequency translation, the output signal of the frequency selection and translation means having one said portion which is translated in frequency to provide a frequency notch between the lower and upper portions, the method comprising the steps of:

restoring the original frequency spectrum, deriving a correcting signal dependent on any difference in frequency and phase in said one signal in those parts of the restored spectrum derived from the lower and upper portions respectively, and reducing any said frequency and phase difference using the correcting signal.

24. A method according to claim 23 wherein the reduction of any phase and frequency difference is carried out at a position in the receiver processing which, as far as signal transmission is concerned, follows the position in which the correcting signal is derived.

25. A receiver for a communication system which employs a transmitter comprising means for causing a band of frequencies to carry information, frequency selection and translation means for dividing the said band into upper and lower portions with at least one signal present at a significant level in both portions and carrying out frequency translation, the output signal of the frequency sleection and translation means having one said portion which is translated in frequency to provide a frequency notch between the lower and upper portions, the receiver comprising:

a receiver processor for recovering the said information, means for deriving first and second signals representative of the phase of the said one signal in the lower and upper portions, respectively, allowing for said translation in frequency, and comparison means for comparing the first and second signals to derive a control signal which when applied to the receiver processor tends to reduce any phase difference between the first and second signals, the output of the comparison means being coupled to the said receiver processor.

26. A receiver for a communication system which employs a transmitter comprising means for causing a band of frequencies to carry information, selection and translation means for dividing the said band into upper and lower portions with at lest one signal present at a significant level in both portions and for carrying out frequency translation, the output signal of the frequency selection and translation means having one said portion which is translated in frequency to provide a frequency notch between the lower and upper portions, the receiver comprising:

a receiver processor for recovering the said information, means for deriving a correcting signal dependent upon difference in frequency and phase in the said one signal as present in the lower and upper portions allowing for said translation in frequency, and error-reduction means coupled to the said receiver processor for reducing any said frequency and phase difference in the output of the said receiver processor in accordance with the correcting signal.

27. A method for use in a receiver of a communication system which employs a transmitter comprising means for causing information to be carried by a band of frequencies, frequency selection and translation means for dividing a band of interest in the frequency spectrum into upper and lower portions with at least one signal present at a significant level in both portions and for frequency translation, the output signal of the frequency selection and translation means having one said portion which is translated in frequency to provide a frequency notch between the lower and upper portions, the method comprising the steps of:

deriving a correcting signal dependent on any difference in frequency and phase between the said one signal as present in the lower and upper portions of the band allowing for said translation in frequency, reducing any said frequency and phase difference using the correcting signal, and recovering the said information.

* * * * *